United States Patent
Hess

(10) Patent No.: US 10,641,867 B2
(45) Date of Patent: May 5, 2020

(54) VEHICLE RADAR SYSTEM WITH SHAPED RADAR ANTENNAS

(71) Applicant: MAGNA ELECTRONICS INC., Auburn Hills, MI (US)

(72) Inventor: Holger Hess, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 281 days.

(21) Appl. No.: 15/675,919

(22) Filed: Aug. 14, 2017

(65) Prior Publication Data

US 2018/0045812 A1    Feb. 15, 2018

Related U.S. Application Data

(60) Provisional application No. 62/375,161, filed on Aug. 15, 2016.

(51) Int. Cl.
*G01S 7/40* (2006.01)
*G01S 13/04* (2006.01)
(Continued)

(52) U.S. Cl.
CPC .......... *G01S 7/4021* (2013.01); *G01S 7/2813* (2013.01); *G01S 7/4008* (2013.01); *G01S 13/04* (2013.01); *G01S 13/878* (2013.01); *G01S 13/931* (2013.01); *G01S 15/04* (2013.01); *G01S 15/876* (2013.01); *G01S 15/931* (2013.01); *H01Q 1/3233* (2013.01); *H01Q 13/0233* (2013.01);
(Continued)

(58) Field of Classification Search
CPC ...... G01S 13/931; G01S 13/04; G01S 13/878; G01S 15/04; G01S 15/876; G01S 17/936; G01S 2013/9332; G01S 2013/0245; G01S 13/42; G01S 2013/9375; G01S 2013/9378; H01Q 13/0233; H01Q 13/12; H01Q 21/064; H01Q 21/293; H01Q 21/065; H01Q 1/36; H01Q 21/08; H01Q 9/0407; H01Q 9/28; H01Q 9/44; H01Q 19/106; H01Q 19/17; H01Q 1/243; H01Q 1/3233; H01Q 19/108; H01Q 21/26; B60K 31/0008; B60Q 9/008; B60R 21/0134; B60R 2001/1223
See application file for complete search history.

(56) References Cited

U.S. PATENT DOCUMENTS 3,099,836 A * 7/1963 Carr ................. H01Q 13/08
343/753
5,467,072 A * 11/1995 Michael ................. G01S 13/931
340/436
(Continued)

FOREIGN PATENT DOCUMENTS

WO    2011090484 A1    7/2011
WO    2018007995 A1    1/2018

*Primary Examiner* — Olumide Ajibade Akonai
(74) *Attorney, Agent, or Firm* — Honigman LLP

(57) ABSTRACT

A sensing system for a vehicle includes a control and sensor disposed at the vehicle. The sensor includes a plurality of antennas, which includes transmitting antennas and receiving antennas. The plurality of antennas includes a two-dimensional antenna array having a rhombus grid arrangement of antennas. Outputs of the antennas are communicated to the control, and the control, responsive to the outputs of the antennas, determines the presence of one or more objects exterior the vehicle and within the field of sensing of the antennas.

12 Claims, 3 Drawing Sheets

(51) Int. Cl.
  *G01S 13/87* (2006.01)
  *G01S 13/93* (2020.01)
  *G01S 15/87* (2006.01)
  *G01S 15/93* (2020.01)
  *H01Q 13/02* (2006.01)
  *G01S 15/04* (2006.01)
  *H01Q 1/32* (2006.01)
  *G01S 7/28* (2006.01)
  *H01Q 21/06* (2006.01)
  *H01Q 21/29* (2006.01)
  *B60K 31/00* (2006.01)
  *B60Q 9/00* (2006.01)
  *G01S 13/931* (2020.01)
  *G01S 15/931* (2020.01)

(52) U.S. Cl.
  CPC ......... *H01Q 21/065* (2013.01); *H01Q 21/293* (2013.01); *B60K 31/0008* (2013.01); *B60Q 9/008* (2013.01); *G01S 2013/9367* (2013.01)

(56) References Cited

U.S. PATENT DOCUMENTS

| | | | |
|---|---|---|---|
| 5,657,023 A * | 8/1997 | Lewis | H01Q 3/2652 342/174 |
| 5,949,331 A | 9/1999 | Schofield et al. | |
| 6,014,105 A * | 1/2000 | Davis | H01Q 1/36 343/700 MS |
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,354 B2 | 2/2004 | Sze | |
| 6,710,770 B2 | 3/2004 | Tomasi et al. | |
| 6,747,606 B2 * | 6/2004 | Harel | H01Q 1/246 343/797 |
| 6,825,455 B1 | 11/2004 | Schwarte | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,053,357 B2 | 5/2006 | Schwarte | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 8,013,780 B2 | 9/2011 | Lynam | |
| 8,027,029 B2 | 9/2011 | Lu et al. | |
| 9,036,026 B2 | 5/2015 | Dellantoni et al. | |
| 9,146,898 B2 | 9/2015 | Ihlenburg et al. | |
| 9,270,028 B2 * | 2/2016 | Ruvinsky | H01Q 5/371 |
| 9,575,160 B1 | 2/2017 | Davis et al. | |
| 9,599,702 B1 | 3/2017 | Bordes et al. | |
| 9,620,861 B1 * | 4/2017 | Banks | H01Q 9/0407 |
| 2010/0231464 A1 * | 9/2010 | Huang | H01Q 1/38 343/702 |
| 2010/0245066 A1 | 9/2010 | Sarioglu et al. | |
| 2012/0115429 A1 * | 5/2012 | Falk | G01S 7/023 455/296 |
| 2015/0145695 A1 * | 5/2015 | Hyde | G08G 1/166 340/905 |
| 2016/0033640 A1 * | 2/2016 | De Mersseman | G01S 7/2813 342/70 |
| 2016/0084941 A1 * | 3/2016 | Arage | G01S 7/41 342/91 |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0310004 A1 * | 10/2017 | Swirhun | H01Q 3/267 |
| 2017/0315231 A1 | 11/2017 | Wodrich | |
| 2017/0356994 A1 | 12/2017 | Wodrich et al. | |
| 2018/0015875 A1 | 1/2018 | May et al. | |

\* cited by examiner

VEHICLE RADAR SYSTEM WITH SHAPED RADAR ANTENNAS

CROSS REFERENCE TO RELATED APPLICATION

The present application claims the filing benefits of U.S. provisional application Ser. No. 62/375,161, filed Aug. 15, 2016, which is hereby incorporated herein by reference in its entirety.

FIELD OF THE INVENTION

The present invention relates generally to a vehicle sensing system for a vehicle and, more particularly, to a vehicle sensing system that utilizes a plurality of sensors at a vehicle to provide a field of sensing around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes one or more sensors (such as radar sensors or the like) disposed at the vehicle to sense respective regions exterior of the vehicle, with the sensors or sensor units comprising a plurality of transmitters and receivers disposed at the vehicle. The sensors comprise an array of multiple radar antennas. The plurality of transmitting antennae and the plurality of receiving antennae are arranged in a two dimensional array of antennae, with the array arranged as a rhombus shape, so as to provide a V-shaped or X-shaped antenna array. Outputs of the two dimensional array of antennae are communicated to a control for processing and, responsive to such processing, the control determines the presence of one or more objects exterior the vehicle and within the field of sensing of the antenna array.

These and other objects, advantages, purposes and features of the present invention will become apparent upon review of the following specification in conjunction with the drawings.

DESCRIPTION OF THE PREFERRED EMBODIMENTS

A vehicle sensing system, such as a driver assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space. The system comprises a radar system having a plurality of radar antenna for transmitting and receiving signals. The system includes a processor that is operable to receive sensing data from multiple sensors to detect objects present in the field of sensing of the radar system. For example, the processor or control may apply two dimensional multiple input multiple output processing to outputs of the two dimensional array of antennae. Responsive to such processing, the control determines the presence of one or more objects exterior the vehicle and within the field of sensing of the antenna array. The sensing system may, for example, provide sensing for at least one of automated parking, blind spot detection, cross traffic alert, lane change and merge aid, automatic emergency braking, pedestrian detection, turn assist, and intersection collision mitigation.

Automotive radar systems typically comprise multiple transmit and receive antennas, called antenna arrays. The total size (aperture) of such an antenna array formation defines the angular accuracy and angular discrimination capabilities of the radar sensing system.

Figure 2:
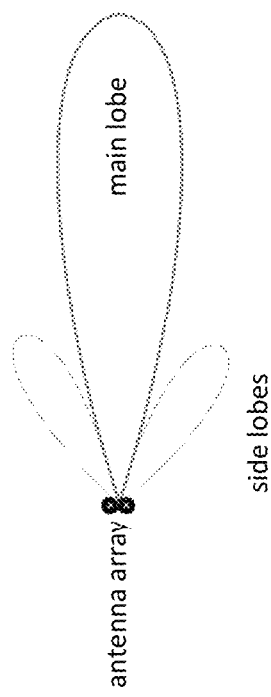
FIG. 2 is a diagram showing the resulting antenna characteristics in far field for the antenna arrays of FIG. 1.
Figure 1:
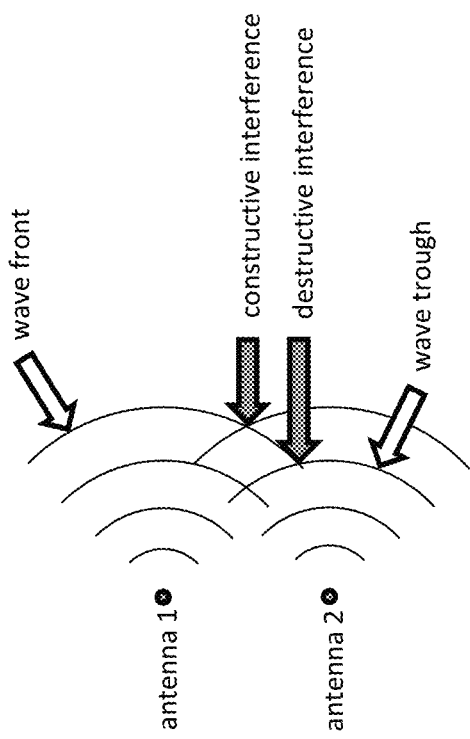
FIG. 1 is a diagram showing standard radar antenna arrays, showing interference effects in the antenna arrays.

Typical radar antennas are typically arrangements of multiple radio antennas. The purpose of such an antenna array is to shape the antenna characteristics. Signals of the different antenna elements in the array will experience constructive and destructive interference (see FIG. 1). These interference effects appear on transmit as well as on receive antennas. These interference effects provide different signal power depending on where it is measured around the antenna. For example, in the far field, interference effects shape the antenna characteristics to a beam (such as shown in FIG. 2). The main beam (also called main lobe) contains the maximum power of the so shaped antenna characteristic. However, interference also gives additional side lobes (FIG. 2) which are usually unwanted (because it is wasted energy for signal transmission).

Figure 3:
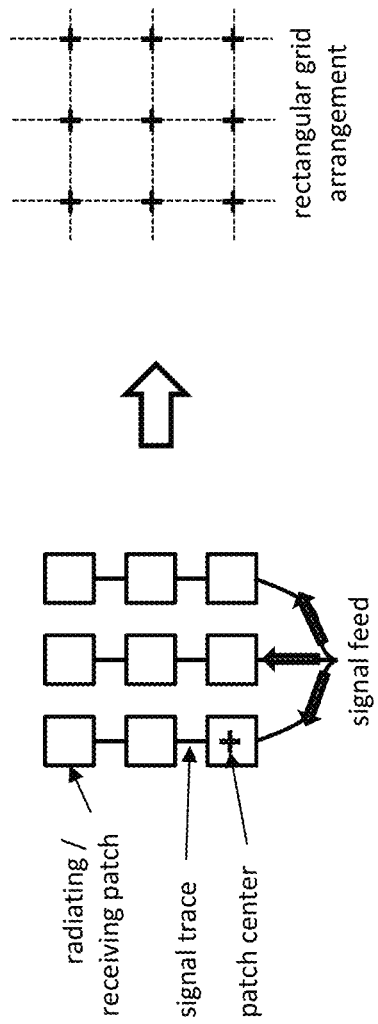
FIG. 3 is a diagram of a typical radar patch antenna array having a rectangular grid pattern.
Figure 4:
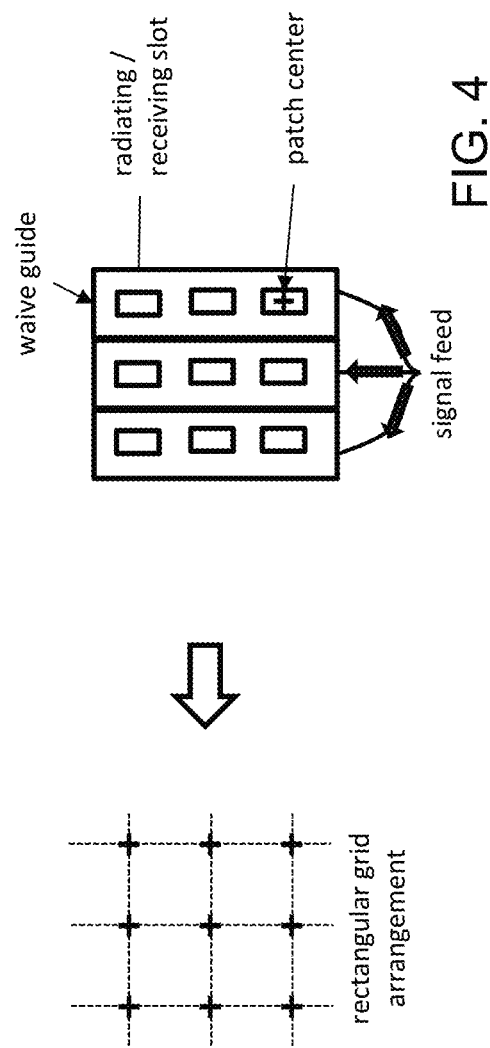
FIG. 4 is a diagram of a typical radar slotted wave guide antenna array having a rectangular grid pattern.

Typical radar antennas are arranged in a rectangular grid pattern. For example, a patch antenna array (FIG. 3) comprises a rectangular grid arrangement of radiating/receiving patches, while a slotted wave guide antenna array (FIG. 4) comprises a rectangular grid arrangement of radiating/receiving slots.

Figure 7:
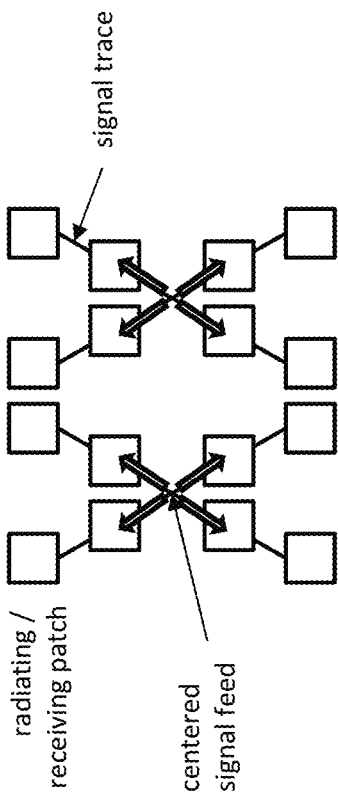
FIG. 7 is a diagram showing X-shaped antenna arrays of the present invention.
Figure 5:
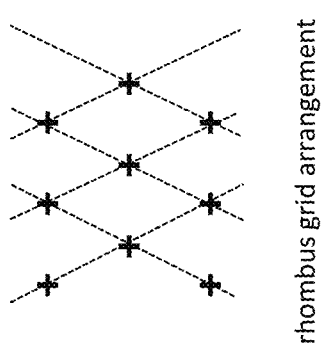
FIG. 5 is a schematic of an antenna array arranged as rhombuses in accordance with the present invention.
Figure 6:
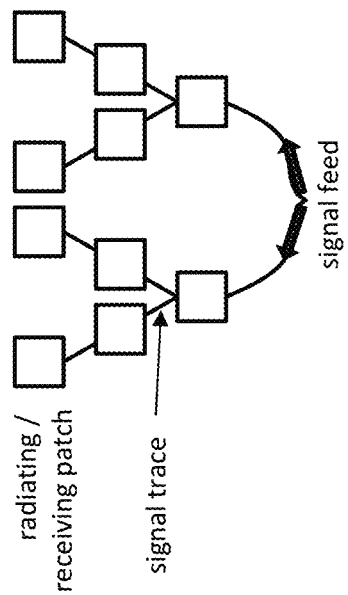
FIG. 6 is a diagram showing V-shaped antenna arrays of the present invention.

The present invention provides a radar sensing system that arranges the antennas in a rhombus shape (see FIG. 5). The rhombus grid arrangement or antenna array reduces unwanted side lobes. For example, an antenna array of the present invention may comprise a generally V-shaped antenna array (see FIG. 6), where a plurality of radiating/receiving patches (or slots) are arranged as two V-shaped antenna arrays, and with a signal feed to the apex of each of the V-shaped arrays. Optionally, for example, an antenna array of the present invention may comprise a generally X-shaped antenna array (see FIG. 7), where a plurality of radiating/receiving patches (or slots) are arranged as two X-shaped antenna arrays, and with a centered signal feed to the center portion of each of the X-shaped arrays.

Thus, the present invention provides enhanced sensing via the non-rectangular grid arrangement of the antenna slots or patches. The rhombus grid arrangement results in reduced unwanted side lobes and thus enhanced sensing of objects present in the field of sensing of the radar system.

Although described as having a plurality of radar or ultrasonic sensors or sensor units disposed at the vehicle, the system of the present invention may utilize any suitable type of sensors, such as Lidar sensors or the like. The means to adapt for the vehicle body response may be adjusted according to the type of sensors implemented in the sensing system.

The system may utilize sensors, such as radar or lidar sensors or the like. The sensing system may utilize aspects of the systems described in U.S. Pat. Nos. 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication Nos. US-2017-0222311 and/or US-2010-0245066, and/or U.S. patent application Ser. No. 15/647,339, filed Jul. 12, 2017, Ser. No. 15/619,627, filed Jun. 12, 2017, Ser. No. 15/584,265, filed May 2, 2017, Ser. No. 15/467,247, filed Mar. 23, 2017, and/or Ser. No. 15/446,220, filed Mar. 1, 2017, and/or International PCT Application No. PCT/IB2017/054120, filed Jul. 7, 2017, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A sensing system for a vehicle, said sensing system comprising:
   a sensor disposed at the vehicle;
   wherein said sensor comprises a plurality of antennas;
   wherein said plurality of antennas comprises transmitting antennas and receiving antennas;
   wherein said plurality of antennas comprises a two-dimensional antenna array having a rhombus grid arrangement of antennas comprising a plurality of sets of antennas each set having a V shape, and wherein each of the V-shaped sets of antennas comprises an apex;
   wherein a signal feed is provided to the apex of each of the V-shaped sets of antennas; and
   a control, wherein outputs of said receiving antennas are communicated to said control, and wherein said control, responsive to said outputs of said receiving antennas, determines the presence of one or more objects exterior the vehicle and within a field of sensing of said sensor.

2. The sensing system of claim 1, wherein said sensor comprises a radar sensor and wherein said radar sensor comprises a plurality of radar antennas.

3. The sensing system of claim 1, wherein said sensor comprises an ultrasonic sensor and wherein said ultrasonic sensor comprises a plurality of ultrasonic antennas.

4. The sensing system of claim 1, wherein said sensing system provides sensing for at least one of automated parking, blind spot detection, cross traffic alert, lane change and merge aid, automatic emergency braking, pedestrian detection, turn assist, and intersection collision mitigation.

5. A sensing system for a vehicle, said sensing system comprising:
   a sensor disposed at the vehicle;
   wherein said sensor comprises a plurality of antennas;
   wherein said plurality of antennas comprises transmitting antennas and receiving antennas;
   wherein said plurality of antennas comprises a two-dimensional antenna array comprising a plurality of sets of antennas each set having a V shape, and wherein each of the V-shaped sets of antennas comprises an apex;
   wherein a signal feed is provided to the apex of each of the V-shaped sets of antennas;
   a control, wherein outputs of said receiving antennas are communicated to said control, and wherein said control, responsive to said outputs of said receiving antennas, determines the presence of one or more objects exterior the vehicle and within a field of sensing of said sensor; and
   wherein said sensing system provides sensing for at least one of automated parking, blind spot detection, cross traffic alert, lane change and merge aid, automatic emergency braking, pedestrian detection, turn assist, and intersection collision mitigation.

6. The sensing system of claim 5, wherein the plurality of V-shaped sets of antennas combine to form a rhombus grid arrangement of antennas.

7. The sensing system of claim 5, wherein said sensor comprises a radar sensor and wherein said radar sensor comprises a plurality of radar antennas.

8. The sensing system of claim 5, wherein said sensor comprises an ultrasonic sensor and wherein said ultrasonic sensor comprises a plurality of ultrasonic antennas.

9. A sensing system for a vehicle, said sensing system comprising:
   a sensor disposed at the vehicle;
   wherein said sensor comprises a plurality of antennas;
   wherein said plurality of antennas comprises transmitting antennas and receiving antennas;
   wherein said plurality of antennas comprises a two-dimensional antenna array comprising a plurality of sets of antennas each set having an X shape, and wherein each of the X-shaped sets of antennas comprises a center region where signal traces of the antennas of each of the X-shaped sets of antennas intersect;
   wherein a signal feed is provided to the center region of each of the X-shaped sets of antennas;
   a control, wherein outputs of said receiving antennas are communicated to said control, and wherein said control, responsive to said outputs of said receiving antennas, determines the presence of one or more objects exterior the vehicle and within a field of sensing of said sensor; and
   wherein said sensing system provides sensing for at least one of automated parking, blind spot detection, cross traffic alert, lane change and merge aid, automatic emergency braking, pedestrian detection, turn assist, and intersection collision mitigation.

10. The sensing system of claim 9, wherein the plurality of X-shaped sets of antennas combine to form a rhombus grid arrangement of antennas.

11. The sensing system of claim 9, wherein said sensor comprises a radar sensor and wherein said radar sensor comprises a plurality of radar antennas.

12. The sensing system of claim 9, wherein said sensor comprises an ultrasonic sensor and wherein said ultrasonic sensor comprises a plurality of ultrasonic antennas.

\* \* \* \* \*